Patented Feb. 13, 1934

1,946,918

UNITED STATES PATENT OFFICE 1,946,918

HYDROGENATION OF CO TO METHYL FORMATE AND METHANOL IN LIQUID PHASE WITH ALCOHOLATE CATALYSTS

Norman D. Scott, Niagara Falls, N. Y., assignor to E. I. du Pont de Nemours & Company, Inc., Wilmington, Del., a corporation of Delaware No Drawing. Application May 13, 1932. Serial No. 611,237

12 Claims. (Cl. 260—106)

This invention relates to a process for hydrogenating CO to methanol and methyl formate by means of alcoholate catalysts as a liquid phase reaction.

The hydrogenation of CO to give methanol as a high pressure gas reaction is well known It involves the use of high temperatures and pressures, and the sensitivity of the solid catalysts to poisons necessitates a high degree of purification of the CO—H$_2$ mixture. The formation of methyl formate from CO and methanol using sodium methylate as a catalyst was described by Stahler, Berichte Vol. 47 P. 580 (1914). Subsequently it was shown by Christiansen, J. Chem. Soc., Vol. 129, p. 143 (1926) that methyl formate could be hydrogenated to methanol over copper catalysts. Although this hydrogenation step does not require the use of high pressures, this two-step process for making methanol has not been able to compete with the direct high pressure synthesis.

We have now found that by the use of other substances in conjunction with the alcoholates of the alkali or alkaline earth metals, it is possible to bring about simultaneous absorption of CO and H$_2$ with the formation of methanol and methyl formate. These auxiliary substances are added either in the form of alcoholates or of other anhydrous materials which are capable of being converted into alcoholates by means of the excess of alkali metal alcoholate used in conjunction with them. Thus anhydrous halides, acetates, formates, or oxides may be used but in amounts such that excess alkali metal or alkaline earth metal alcoholate remains, after metathesis. Compounds of the following metals have been shown to have the ability to induce hydrogenation; barium, strontium, lead, thorium and cadmium. The results are particularly favorable with cadmium compounds.

Other alcohols than methanol can be used as solvent medium, and the choice of solvent will depend on the ease of separation of products unless a mixture of alcohols such as methanol and ethanol is desired. The use of an alcohol other than methanol has the advantage for experimental purposes of permitting the methanol and methyl formate to be detected and determined by chemical tests. The addition of a third substance as a component of the catalyst mixture is frequently advantageous, apparently as a means of increasing the solubility of the substances capable of bringing about hydrogenation. Thus, for example, the addition of sodium iodide to methanol containing sodium and cadmium methoxides increases the amount of cadmium compound in solution and also the rate of hydrogen absorption. It is obvious that the addition of iodides to a solution containing lead compounds might be expected to have an unfavorable effect. The choice of a catalyst combination will be determined largely by solubility relations in the solvent used, and a wide variety of combinations will suggest themselves to anyone skilled in the art.

The advantages of this process for hydrogenating CO are that it operates at very moderate temperatures, relatively moderate pressures, the catalysts are easily made and not subject to poisoning by traces of impurities, and the process can be operated to give either methanol or methyl formate or a mixture of the two. The reaction can be detected at temperatures between 30° and 125° C., the optimum temperature range being 50-100° C. The rate of reaction increases with rise of temperature. The upper temperature limit is set largely by the tendency of the mixture to go neutral, the sodium methylate being converted to sodium formate with methyl ether as by-product as represented by the equation

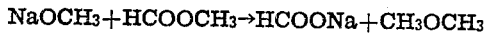
$$NaOCH_3 + HCOOCH_3 \rightarrow HCOONa + CH_3OCH_3$$

The total pressure may vary from 200 lbs./sq. in. upward, the optimum being determined by balancing the cost of equipment and compresison against the increased rate of reaction and whether the product desired is mainly methanol or methyl formate. The proportion of methyl formate in the liquid in the autoclave will depend mainly on the temparture and the partial pressure of CO. Since methyl formate and methanol are easily separated by distillation the process may be operated to give either of these materials as the sole product by withdrawing a portion of the liquid from the autoclave, subjecting it to a flash distillation and returning all but the desired product to the autoclave. The make up of the gas will of course vary with the nature of the product being withdrawn. For methanol it will require two volumes of H$_2$ to one of CO; and for methyl formate equal volumes of the two gases. The catalyst mixtures are apparently not subject to poisoning by traces of materials, but must be protected from CO$_2$, water and other materials which would cause the sodium alcoholate to be neutralized.

As further illustration of the invention the following examples are given, although the invention is not limited to them except as set forth in the claims. In these examples the methanol yields given include both free methanol and the methanol equivalent of methyl formate.

*Example 1*

150 cc. methanol was used to dissolve 4.6 gms. sodium. To the solution was added 9.2 gms. $CdI_2$ and 24.9 gms. KI. The mixture was placed in a bomb mounted on a shaker, heated to 72° C. and kept at this temperature while saturated with CO to a total back pressure of 525 pounds to produce methyl formate. The pressure was then raised to 1760 lbs. by means of $H_2$, additional $H_2$ being added to maintain approximately this pressure but with the valve closed at intervals to permit observations of the rate of pressure drop due to hydrogenation of the formate and further CO absorption. During the first 20 hrs. the temperature was kept at 72° C. and the absorption rate observed on the pressure gauge was 27 lbs. drop/hr., (calculations showing that a drop of 140 lbs. at 72° C. was equivalent to forming 1 cc. of methanol). The temperature was raised to 80° C. for 24.5 hrs. the absorption rate increasing to 64 lbs./hr. It was then raised to 90° C. for 23.5 hrs. the absorption rate becoming 141 lbs./hr. at the start, decreasing to 61 lbs./hr. at the end. This procedure would produce chiefly methanol since no additional CO was introduced after the first saturation. From gauge readings the amount of methanol formed was estimated to be 29.5 cc. The amount actually recovered in excess of that taken at the start was 26.0 cc. Without the use of iodides the rate would have been lower.

*Example 2*

9.2 gms. fused $CdCl_2$ was added to a solution of 3.5 gms. sodium in 75 cc. dry ethanol, the mixture placed in a brass bomb heated to 66° C and maintained at this temperature. To produce ethyl formate the solution was saturated with CO at a partial pressure of 600 lbs. and shaken for three hours after the pressure was practically steady. $H_2$ was then admitted bringing the total pressure to 1200 lbs., and a 1:1 mixture of CO and $H_2$ to bring the total pressure to 1440 lbs. and maintain at about this pressure. This simultaneous absorption of CO and $H_2$ produced approximately equivalent amounts of methyl formate and methanol. The rate of reaction was observed by following gas absorption by means of pressure readings. The run was continued 20 hrs. A total of 9.9 cc. methanol including that present as methyl formate was found after saponification of the product recovered at the end of the run. The rate of production was at a maximum at the start, being equivalent to about 2 cc. methanol per hour. The decrease in rate appears to be mainly due to partial precipitation of methoxy compounds.

*Example 3*

A solution of 3.5 gms. sodium in 75 cc. dry ethanol was treated with 9.3 gms. $ThCl_4$ and heated in a brass bomb to 66° C., and shaken while saturated with CO to a back pressure of 585 lbs./sq. in. Hydrogen was then added increasing the total pressure to 1225 lbs. Shaking was continued during 18 hrs. There was a slow absorption of gas as shown by pressure readings. The product at the end of the run was found by chemical tests to contain 1.0 cc. methanol.

In the appended claims the term "alkali-forming metal" is used to comprise the metals of the alkali and the alkaline earth groups; the terms "alcohol" and "alcoholate" are to be understood to refer to the lower aliphatic primary monohydric alcohols.

I claim:

1. Method of hydrogenation of CO which comprises absorbing carbon monoxide and hydrogen in an alcohol solution containing a plurality of alcoholates, one of said alcoholates being that of an alkali-forming metal.

2. Method of hydrogenation of CO which comprises absorbing carbon monoxide and hydrogen in an alcohol solution containing an alcoholate of an alkali-forming metal and a soluble compound of a metal selected from the group consisting of cadmium, barium, strontium, lead and thorium.

3. Method of hydrogenation of CO which comprises absorbing carbon monoxide and hydrogen in an alcohol solution containing a sodium alcoholate and a soluble compound of a metal selected from the group consisting of cadmium, barium, strontium, lead and thorium.

4. Method of hydrogenation of CO which comprises absorbing carbon monoxide and hydrogen in an alcohol solution containing a sodium alcoholate and a soluble cadmium compound.

5. Method of hydrogenation of CO which comprises absorbing carbon monoxide and hydrogen in an alcohol solution containing a sodium alcoholate and a soluble barium compound.

6. Method of hydrogenation of CO which comprises absorbing carbon monoxide and hydrogen in an alcohol solution containing a sodium alcoholate and a soluble strontium compound.

7. Method of hydrogenation of CO which comprises absorbing carbon monoxide and hydrogen in an alcohol solution containing a mixture of sodium and cadmium alcoholates.

8. Method of hydrogenation of CO which comprises absorbing carbon monoxide and hydrogen in an alcohol solution containing a plurality of alcoholates, one of said alcoholates being that of an alkali-forming metal, and a soluble iodide.

9. Method of hydrogenation of CO which comprises absorbing carbon monoxide and hydrogen in an alcohol solution containing a sodium alcoholate and a soluble compund of a metal selected from the group consisting of cadmium, barium, strontium, lead and thorium, and a soluble iodide.

10. Method of hydrogenation of CO which comprises absorbing carbon monoxide and hydrogen in an alcohol solution containing a sodium alcoholate and a soluble cadmium compound, and a soluble iodide.

11. Method of hydrogenation of CO which comprises absorbing carbon monoxide and hydrogen in an alcohol solution containing a mixture of sodium and cadmium alcoholates and a soluble iodide.

12. Method of hydrogenation of CO which comprises absorbing carbon monoxide and hydrogen in an alcohol solution containing a mixture of sodium and cadmium alcoholates and an alkali metal iodide.

NORMAN D. SCOTT.